United States Patent
Nakashima et al.

(10) Patent No.: US 11,075,470 B2
(45) Date of Patent: Jul. 27, 2021

(54) WIRE HARNESS WITH COVERING MATERIALS AND TUBE CONTAINING CROSS-LINKED POLYETHYLENE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kazuo Nakashima, Yokkaichi (JP); Hironobu Rachi, Yokkaichi (JP); Katsutoshi Izawa, Yokkaichi (JP); Ryo Kuroishi, Yokkaichi (JP); Takashi Adachi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/814,224

(22) Filed: Mar. 10, 2020

(65) Prior Publication Data
US 2020/0313318 A1 Oct. 1, 2020

(30) Foreign Application Priority Data
Mar. 25, 2019 (JP) .............................. JP2019-056974

(51) Int. Cl.
*H01R 4/72* (2006.01)
*B60R 16/04* (2006.01)
(Continued)

(52) U.S. Cl.
CPC ........... *H01R 4/72* (2013.01); *B60R 16/0215* (2013.01); *B60R 16/04* (2013.01); *H01R 4/62* (2013.01)

(58) Field of Classification Search
CPC . H01R 4/02; H01R 4/72; H01R 4/021; H01R 4/726; H01R 43/0207; H01R 4/62;
(Continued)

(56) References Cited

U.S. PATENT DOCUMENTS 3,294,869 A * 12/1966 Robinson ............... C08F 255/02
525/281
3,526,683 A * 9/1970 Thorp ................. H02G 15/1806
264/485
(Continued)

FOREIGN PATENT DOCUMENTS

JP 2004-072943 A 3/2004

*Primary Examiner* — Timothy J Thompson
*Assistant Examiner* — Michael F McAllister
(74) *Attorney, Agent, or Firm* — Oliff PLC

(57) ABSTRACT

A wire harness that includes a first wire and a second wire each including a core wire and a covering material that covers the core wire; and a tube, wherein: the tube covers a connection between the core wire of the first wire and the core wire of the second wire, each of the covering materials contains a cross-linked polyethylene, the tube contains a cross-linked polyethylene, the tube and each of the covering materials are directly joined, and a tensile shear strength between the tube and each of the covering materials is 350 kPa or more.

9 Claims, 3 Drawing Sheets

(51) Int. Cl.
*H01R 4/62* (2006.01)
*B60R 16/02* (2006.01)

(58) Field of Classification Search
CPC ...... H02G 15/18; H02G 3/04; B60R 16/0215; B60R 16/04; H01B 7/00; H01B 7/282
USPC .......................................................... 361/827
See application file for complete search history.

(56) References Cited

U.S. PATENT DOCUMENTS

| | | | | |
|---|---|---|---|---|
| 4,341,921 A * | 7/1982 | Simpson | ................ | H01R 4/723 |
| | | | | 174/84 R |
| 4,559,973 A * | 12/1985 | Hane | ................... | B29C 61/0616 |
| | | | | 138/138 |
| 6,245,174 B1 * | 6/2001 | Cordia | ................. | B29C 66/0242 |
| | | | | 156/160 |
| 6,658,735 B2 * | 12/2003 | Ito | ........................... | H01R 4/183 |
| | | | | 174/84 C |
| 10,319,495 B2 * | 6/2019 | Kuroishi | .............. | H01B 7/0009 |
| 10,373,736 B2 * | 8/2019 | Nakai | ....................... | H01B 7/17 |
| 10,897,096 B2 * | 1/2021 | Izawa | ...................... | H01R 4/02 |
| 2012/0128906 A1 * | 5/2012 | Jackson | .................... | C08F 8/42 |
| | | | | 428/35.1 |
| 2013/0020107 A1 * | 1/2013 | Pagliuca | ................ | H01B 7/0216 |
| | | | | 174/120 SR |
| 2014/0367141 A1 * | 12/2014 | Tozawa | .................... | H01B 5/08 |
| | | | | 174/102 R |
| 2015/0248948 A1 * | 9/2015 | Choi | ....................... | H01B 3/441 |
| | | | | 524/261 |
| 2016/0019999 A1 * | 1/2016 | Yamasaki | ............... | C08L 23/08 |
| | | | | 174/72 A |
| 2016/0071630 A1 * | 3/2016 | Sugino | .................. | H01R 4/021 |
| | | | | 174/68.3 |
| 2017/0200536 A1 * | 7/2017 | Yabe | ....................... | B32B 27/36 |
| 2018/0102203 A1 * | 4/2018 | Nakai | .................. | H01B 7/0009 |
| 2018/0301886 A1 * | 10/2018 | Yamasaki | ............... | B32B 27/32 |
| 2019/0237217 A1 * | 8/2019 | Shroll | ...................... | H02G 1/14 |
| 2019/0351639 A1 * | 11/2019 | Yamasaki | ............... | B32B 27/08 |

* cited by examiner

WIRE HARNESS WITH COVERING MATERIALS AND TUBE CONTAINING CROSS-LINKED POLYETHYLENE

BACKGROUND

The present disclosure relates to a wire harness.

Conventionally, wire waterproof structures are known in which connection portions between wires are covered with tubes, thereby preventing liquid from entering the interior of the wires from the connection portions. For example, JP 2004-72943A describes an example of a grounding wire waterproof structure in which an end portion of a wire is waterproofed using a heat-shrinkable tube.

SUMMARY

In the case of waterproofing a wire including a covering material made of a cross-linked polyethylene, an adhesive is generally disposed between the cross-linked polyethylene and the tube. However, an adhesive used for a cross-linked polyethylene has the property of being prone to soften when heat is applied thereto. For this reason, depending on the usage environment or the like, there is the possibility that the adhesive will soften and will be extruded to the outside of the tube from between the tube and an insulated wire. Additionally, the use of an adhesive has resulted in an increase in the volume and the cost of the waterproof structure.

An exemplary aspect of the disclosure provides a wire harness that allows a covering material of a wire and a tube to be joined without using an adhesive, and exhibits good waterproofing performance.

An aspect of the present disclosure includes a wire harness including: a first wire and a second wire each including a core wire and a covering material that covers the core wire; and a tube, wherein: the tube covers a connection between the core wire of the first wire and the core wire of the second wire, each of the covering materials contains a cross-linked polyethylene, the tube contains a cross-linked polyethylene, the tube and each of the covering materials are directly joined, and a tensile shear strength between the tube and each of the covering materials is 350 kPa or more.

According to the present disclosure, it is possible to provide a wire harness that exhibits good waterproofing performance, while suppressing an increase in the volume and the cost of a waterproof structure, by joining a covering material of a wire and a tube without using an adhesive.

DETAILED DESCRIPTION OF EMBODIMENTS

Figure 1:
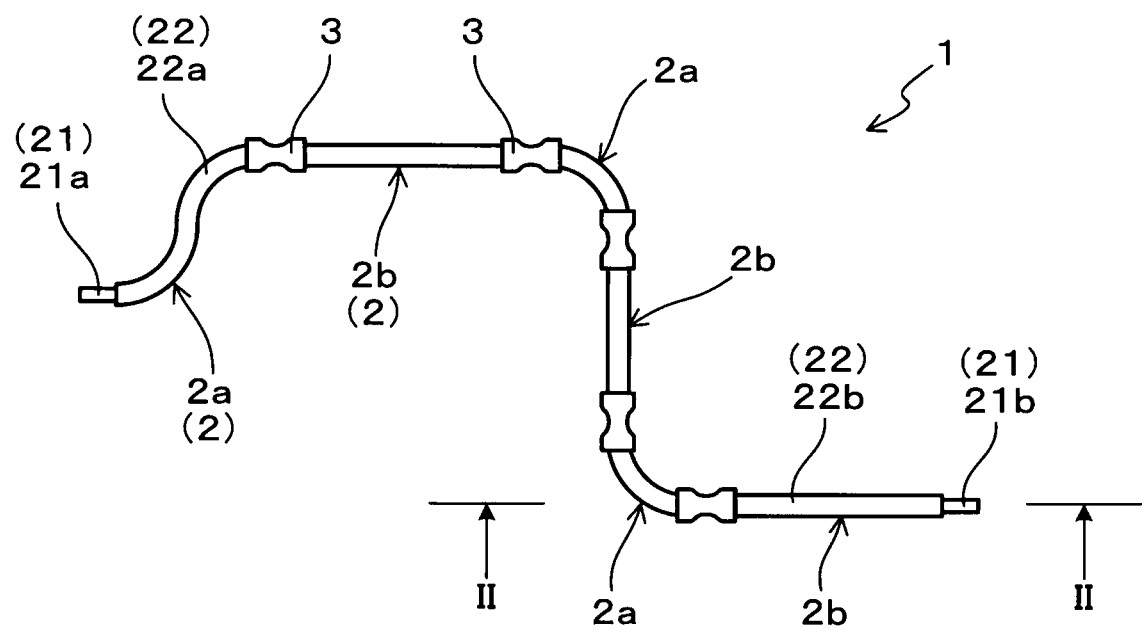
FIG. 1 is a plan view of a wire harness according to Embodiment 1.

Description of Embodiments of the Present Disclosure

First, aspects of the present disclosure will be listed and described.

A wire harness of the present disclosure includes a first wire and a second wire each including a core wire and a covering material that covers the core wire, and a tube. The tube covers a connection portion between the core wire of the first wire and the core wire of the second wire. Each of the covering materials contains a cross-linked polyethylene (XLPE). The tube contains a cross-linked polyethylene. The tube and each of the covering materials are directly joined. The tensile shear strength between the tube and each of the covering materials is 350 kPa or more.

In the wire harness of the present disclosure, a cross-linked polyethylene is contained in all of the covering material of the first wire, the covering material of the second wire, and the tube. Accordingly, the cross-linked polyethylene contained in each of the covering materials and the cross-linked polyethylene contained in the tube can be rendered compatible with each other at the interface between the covering material and the tube. Consequently, the covering material and the tube can be directly joined without using an adhesive, and the tensile shear strength between the covering material and the tube can be 350 kPa or more. Since the tensile shear strength between the covering material and the tube in the wire harness of the present disclosure is 350 kPa or more, it is possible to achieve good waterproofing performance (including, not only the prevention of penetration of water, but also prevention of penetration of liquid such as oil; this description will be omitted in the following) between the covering material and the tube.

Thus, with the wire harness of the present disclosure, it is possible to join the covering material of a wire and a tube without using an adhesive, thereby providing a wire harness that exhibits good waterproofing performance.

The wire harness of the present disclosure may include at least one first wire described above, at least one second wire described above, and at least one tube described above. That is, the wire harness may have a configuration in which one first wire and one second wire are connected via the connection portion, and the connection portion is covered with the tube, or may have a configuration in which a plurality of first wires and a plurality of second wires are connected in an alternating manner via the connection portions, and each of these connection portions are covered with the tube. The wire harness may further include a wire that is different from the first wire and the second wire.

In the wire harness of the present disclosure, the first wire and the second wire may have the same configuration, or may have configurations that are different in at least one of the core wire and the covering material.

A cross-linked polyethylene is contained in the covering material of the first wire. The covering material of the first wire may contain an additive such as a flame retardant, a filler, and a colorant, in addition to the cross-linked polyethylene. The core wire of the first wire may be a single-core wire, i.e., a wire material made of a single conductor, may be a stranded wire, i.e., a wire material formed by twisting together a plurality of constituent conductor wires, or may be a pipe. The core wire of the first wire may be made of a highly electrically conductive metal such as copper (including pure copper and a copper alloy; the same also applies to the following) and aluminum (including pure aluminum and an aluminum alloy; the same also applies to the following).

A cross-linked polyethylene is contained in the covering material of the second wire, as in the case of the first wire. The covering material of the second wire may contain an additive such as a flame retardant, a filler, and a colorant, in addition to the cross-linked polyethylene. As in the case of the first wire, the core wire of the second wire may be a single-core wire, i.e., a wire material made of a single conductor, may be a stranded wire, i.e., a wire material formed by twisting together a plurality of constituent conductor wires, or may be a pipe. The core wire of the second wire may be made of a highly electrically conductive metal such as copper and aluminum.

A cross-linked polyethylene is contained in the tube of the wire harness of the present disclosure. The tube may contain an additive such as a flame retardant, a filler, and a colorant, in addition to the cross-linked polyethylene. For example, it is possible to use a heat-shrinkable tube containing a cross-linked polyethylene as the tube.

There are no particular limitations on the method for directly joining the tube and each of the covering materials in the wire harness of the present disclosure. As the method for directly joining the tube and the covering material, it is possible to use, for example, a method in which the tube is pressed against the covering material, while heating, with the tube and the covering material overlapped with each other. At this time, it is preferable that the heating temperature is higher than the melting point of the cross-linked polyethylene contained in the tube and the melting point of the cross-linked polyethylene contained in the covering material. By applying heat and pressure to the interface between the tube and the covering material, the cross-linked polyethylene contained in the tube and the cross-linked polyethylene contained in the covering material can be rendered compatible with each other. Consequently, it is possible to directly join the tube and the covering material.

In the wire harness of the present disclosure, the tensile shear strength between the tube and each of the covering materials is 350 kPa or more. Accordingly, it is possible to prevent liquid from entering the interior of the tube from between the tube and the covering material. From the viewpoint of further enhancing the waterproofing performance of the wire harness, it is preferable that the tensile shear strength between the tube and the covering material is 450 kPa or more.

The tensile shear strength between the tube and each of the covering materials is measured by the following method. First, a test piece for tensile testing that includes a joining portion between the tube and the covering material is collected from the wire harness. The test piece includes a small rectangular piece of the covering material and a small rectangular piece of the tube, and is shaped such that an end portion of the small piece of the covering material and an end portion of the small piece of the tube are joined. Using this test piece, a tensile test is performed by a method in compliance with JIS K 6850:1999, and the breaking stress thus determined is used as the tensile shear strength. The width of the test piece is 25 mm, for example. The length of the joining portion between the tube and the covering material in the test piece, i.e., the length, in the axial direction of the wires, of a portion where the covering materials and the tube overlap, is 12.5 mm, for example. In this case, the joined area of the tube and the covering material is 312.5 mm$^2$. However, if the tube or the covering material breaks at the base material portion in the tensile test, the measurement may be performed using a test piece having a joined area smaller than 312.5 mm$^2$.

The wire harness of the present disclosure may have a configuration in which the wire harness includes a lamella phase extending from a base material portion of the tube to a base material portion of each of the covering materials. With this configuration, it is possible to more firmly join the tube and each of the covering materials, thus further enhancing the waterproofing performance of the wire harness.

Here, "lamella phase" refers to a crystalline phase in which a molecular chain of polyethylene is folded. When observed with a transmission electron microscope, a lamella phase in a cross-linked polyethylene is observed as a streaked pattern, for example. Note that examples of the lamella phase will be described in the experimental examples described below.

In the wire harness of the present disclosure, each of the core wires has a nominal cross-sectional area of preferably 4 mm$^2$ or more, more preferably 8 mm$^2$ or more, even more preferably 12 mm$^2$ or more, further preferably 15 mm$^2$ or more. With the wire harness of the present disclosure, it is possible to prevent liquid from entering the interior of the tube from between the tube and each of the covering materials even if the core wires have a large nominal cross-sectional area.

In general, problems such as an increase in mass and a reduction in bendability of the wire harness as a whole tend to occur as the nominal cross-sectional area of the core wire increases. To suppress these problems, it is conceivable to use methods in which a plurality of types of wires are connected, for example, a method in which a wire with a relatively light weight and a wire with a relatively large mass are connected so as to suppress an increase in the mass of the wire harness or a method in which a wire with excellent bendability and a wire with low bendability are connected so as to partly improve the bendability of the wire harness. With the wire harness of the present disclosure, the waterproofing performance can be improved with the tube even if a plurality of types of wires are connected. Therefore, the configuration of the wire harness of the present disclosure is especially effective when using a wire including a core wire with a large nominal cross-sectional area.

The tube in the wire harness of the present disclosure may have a configuration in which the tube contains a cross-linked polyethylene that has been cross-linked using an electron beam. In this case, the waterproofing performance of the wire harness can be further enhanced. A tube containing a cross-linked polyethylene that has been cross-linked using an electron beam has high heat resistance. Furthermore, a tube containing a cross-linked polyethylene that has been cross-linked using an electron beam can be shrunk by application of heat, and it is therefore possible to easily perform the operation of passing the first wire and the second wire through the tube.

The covering material in the wire harness of the present disclosure may have a configuration in which each of the covering materials contains a cross-linked polyethylene that has been cross-linked using an electron beam, or a cross-linked polyethylene that has been cross-linked using a silane coupling agent. In this case, the waterproofing performance of the wire harness can be further enhanced. Furthermore, a covering material containing each of these cross-linked polyethylenes has high heat resistance.

In the wire harness of the present disclosure, it is preferable that the core wire of the first wire is a stranded wire made of copper, and the core wire of the second wire is a single-core wire or stranded wire made of aluminum. A stranded wire made of copper has both high electrical conductivity and excellent bendability. Accordingly, by forming the core wire of the first wire as a stranded wire made of copper, the wire harness can be easily bent at the first wire. Consequently, it is possible to further improve the workability during the routing operation of the wire harness.

Aluminum has relatively high electrical conductivity among metals, although inferior to copper. Furthermore, aluminum has a smaller specific gravity than copper. Therefore, by forming the core wire of the second wire as a single-core wire or stranded wire made of aluminum, it is possible to suppress an increase in the electrical resistance of the wire harness, while further reducing the mass.

Accordingly, a wire harness including a first wire and a second wire including the above-described specific core wires has good electrical conductivity and good bendability, and can be more easily reduced in weight.

In the wire harness of the present disclosure, it is more preferable that the core wire of the first wire is a stranded wire made of copper, and the core wire of the second wire is a single-core wire made of aluminum. In this case, the cost of the second wire can be further reduced, and the nominal cross-sectional area thereof can be further increased, as compared with the case of a stranded wire. Therefore, it is possible to suppress an increase in the electrical resistance of the wire harness, while further reducing the cost.

The wire harness of the present disclosure may have a configuration in which the wire harness includes a pipe, and the tube is disposed within a barrel of the pipe. With such a configuration, the tube and the connection portion in the tube can be protected by the pipe, thus making it possible to maintain the waterproofing performance of the wire harness over a long period of time.

The wire harness of the present disclosure may be configured to, in an architecture (also may be referred to as "structure"; the same also applies to the following) including a high-voltage battery and an inverter, connect the high-voltage battery and the inverter.

An architecture of the present disclosure may have a configuration including the above-described wire harness; a high-voltage battery; and an inverter, wherein the core wire of the first wire is connected to the high-voltage battery, and the core wire of the second wire is connected to the inverter.

The architecture of the present disclosure may have a configuration in which the wire harness is disposed underneath a floor of a vehicle.

Details of Embodiments of the Present Disclosure

Specific examples of the wire harness according to the present disclosure will be described below with reference to the drawings. It should be noted that the present disclosure is not limited to these examples.

Embodiment 1

Figure 2:
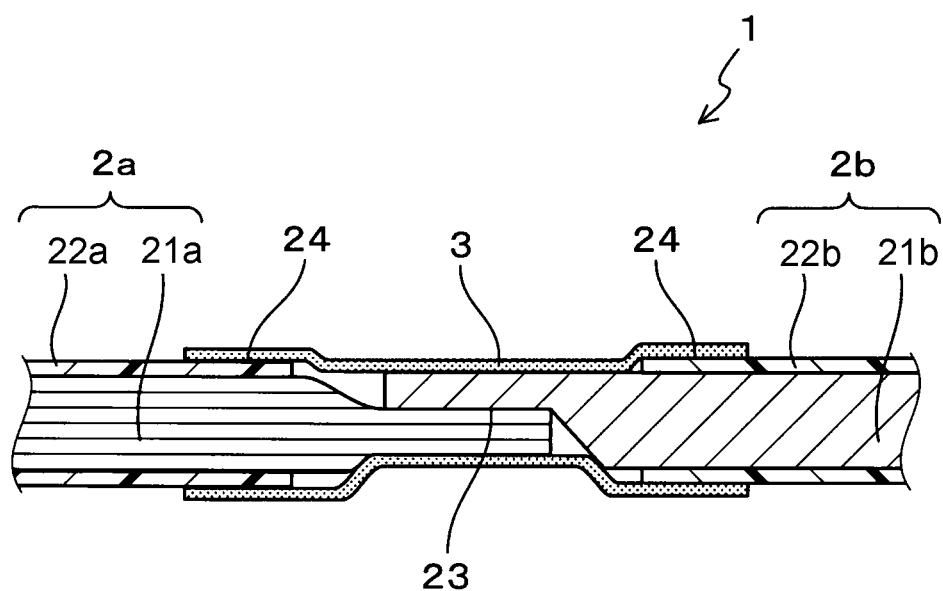
FIG. 2 is a cross-sectional view taken along the arrows II-II in FIG. 1.

A wire harness 1 of Embodiment 1 will be described with reference to FIGS. 1 to 4. As shown in FIG. 1, the wire harness 1 of the present embodiment includes a first wire 2a and a second wire 2b each including a core wire 21 (21a, 21b) and a covering material 22 (22a, 22b) that covers the core wire 21, and a tube 3. As shown in FIG. 2, the tube 3 covers a connection portion 23 between the core wire 21a of the first wire 2a and the core wire 21b of the second wire 2b. The covering material 22 contains a cross-linked polyethylene. The tube 3 contains a cross-linked polyethylene. The tube 3 and each of the covering materials 22 are directly joined. The tensile shear strength between the tube 3 and each of the covering materials 22 is 350 kPa or more.

As shown in FIG. 1, the wire harness 1 of the present embodiment includes a plurality of first wires 2a and a plurality of second wires 2b. A first wire 2a is disposed at one end of the wire harness 1, and a second wire 2b is disposed at the other end. Although not shown, a connecting member such as a connector and a terminal may be attached to an end portion of the wire harness 1.

The first wires 2a and the second wires 2b are connected in an alternating manner via the connection portions 23. More specifically, as shown in FIG. 2, the core wire 21a of each of the first wires 2a is exposed to the outside of the corresponding covering material 22a at an end portion of the first wire 2a. Similarly, the core wire 21b of each of the second wires 2b is exposed to the outside of the corresponding covering material 22b at an end portion of the second wire 2b. Then, the core wire 21a exposed at the end portion of the first wire 2a and the core wire 21b exposed at the end portion of the second wire 2b are connected to each other, thus forming a connection portion 23.

Specifically, the covering material 22a of the first wire 2a in the present embodiment is a cross-linked polyethylene that has been cross-linked using an electron beam. Specifically, the core wire 21a of the first wire 2a is a stranded wire made of copper.

Specifically, the covering material 22b of the second wire 2b is a cross-linked polyethylene that has been cross-linked using an electron beam. Specifically, the core wire 21b of the second wire 2b is a single-core wire made of aluminum.

As shown in FIG. 2, in the wire harness 1 of the present embodiment, the tube 3 covers the covering material 22a at the end portion of the first wire 2a, the connection portion 23, and the covering material 22b at the end portion of the second wire 2b. Specifically, the tube 3 of the present embodiment is a heat-shrinkable tube containing a cross-linked polyethylene that has been cross-linked using an electron beam. The tube 3 of the present embodiment presses the covering materials 22 of the wires 2 (2a, 2b) inward in the radial direction of the wires 2.

The length of a joining portion 24 between each of the covering materials 22 and the tube 3, i.e., the length, in the axial direction of the wire 2, of the portion where the covering material 22 and the tube 3 overlap, is preferably 2.5 mm or more, more preferably 5.0 mm or more. In this case, problems such as the tube coming off and the occurrence of positional displacement of the tube can be further suppressed during the operation of mounting the tube to the wire.

Figure 3:
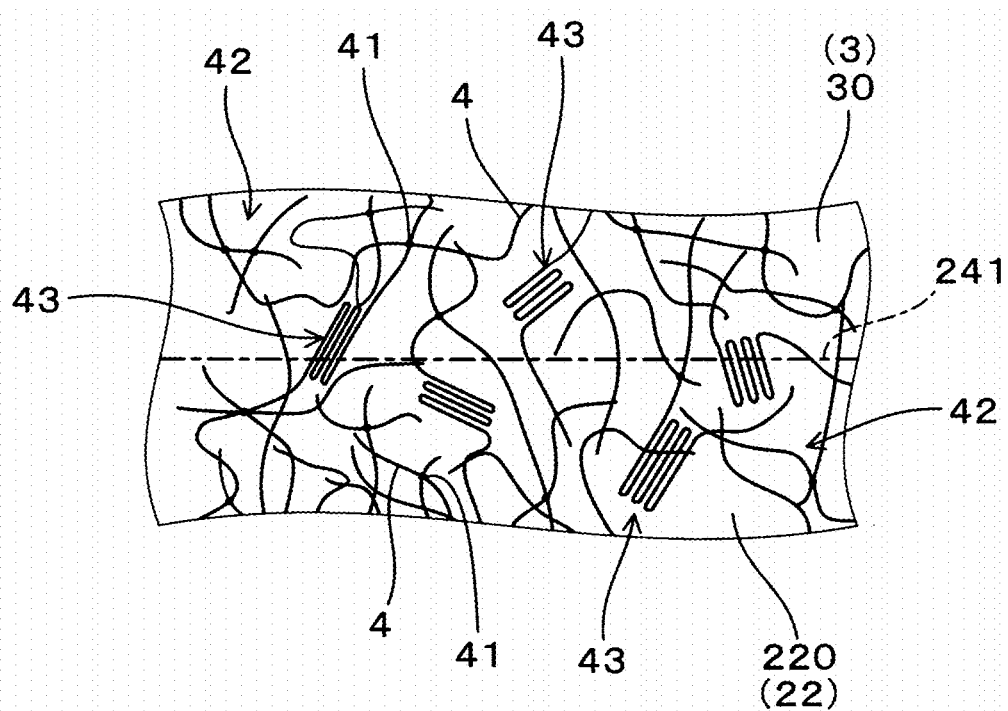
FIG. 3 is a schematic diagram of an interface between a tube and a covering material according to Embodiment 1.

FIG. 3 schematically shows a joining mode between the tube 3 and the covering material 22. The cross-linked polyethylenes contained in the tube 3 and the covering material 22 each have a structure in which a plurality of polyethylene molecular chains 4 are cross-linked at cross-linking points 41. In addition, the cross-linked polyethylenes each include an amorphous phase 42 in which the polyethylene molecular chains are disorderly disposed, and a lamella phase 43 in which the polyethylene molecular chains are regularly folded.

In the mode shown in FIG. 3, a structure is formed in which the cross-linked polyethylene contained in the tube 3 and the cross-linked polyethylene contained in the covering material 22 are entangled with each other beyond an interface 241 between the tube 3 and the covering material 22. Additionally, in the mode shown in FIG. 3, a structure including a lamella phases 43 extending from a base material portion 30 of the tube 3 to a base material portion 220 of the covering material 22 is formed. By rendering the cross-linked polyethylene contained in the tube 3 and the cross-linked polyethylene contained in the covering material 22 compatible with each other in this manner, it is possible to directly join the tube 3 and the covering material 22.

Figure 4:
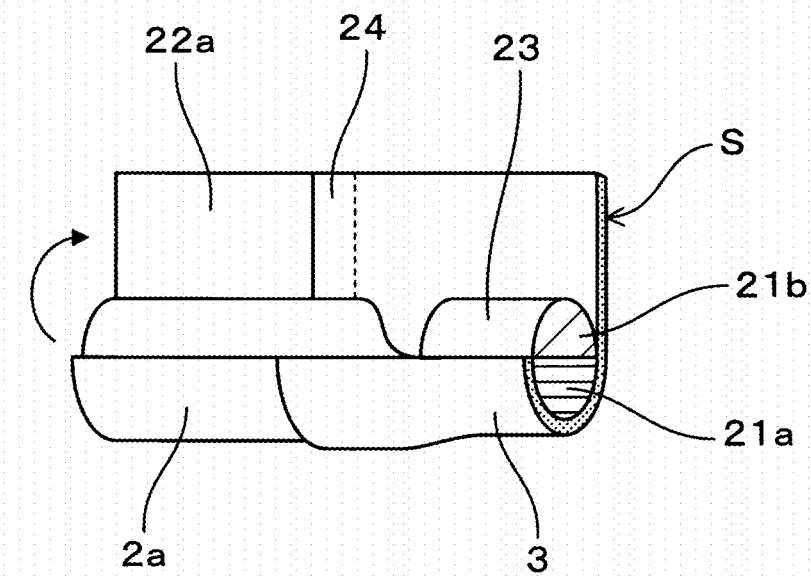
FIG. 4 is a schematic diagram showing a method for producing a test piece used for measuring a tensile shear strength according to Embodiment 1.

The tensile shear strength between the tube 3 and each of the covering materials 22 in the wire harness 1 of the present embodiment is measured by the following method. First, the wire harness 1 is cut at two locations, namely, the covering material 22 of a wire 2 and the connection portion 23 between the core wires 21, thus producing a small piece including the joining portion 24 between the tube 3 and the covering material 22, shown in FIG. 4. Note that although FIG. 4 shows an example in which the wire harness 1 is cut at two locations, namely, the covering material 22a of the first wire 2a and the connection portion 23, the wire harness 1 may be cut at two locations, namely, the covering material 22b of the second wire 2b and the connection portion 23.

By cutting the covering portion and the tube 3 of this small piece open along the axial direction of the wire harness 1, a sheet-like test piece S that includes the covering portion in a rectangular shape and the tube 3 in a rectangular shape, and in which one end of the covering portion and one end of the tube 3 are overlapped each other can be obtained. Using this test piece S, a tensile test is performed by using a method that is in compliance with JIS K 6850:1999, and the breaking strength thus determined is used as the tensile shear strength. Note that, for the tensile test, the entire test piece S may be used, or a part of the sheet-like test piece S may be used. The area of the joining portion 24 between the covering material 22 and the tube 3 in the test piece S is preferably greater than or equal to the circumference of the wire 2×2.5 mm, for example. However, if the tube 3 or the covering material 22 breaks at the base material portion, the area of the joining portion 24 in the test piece S may be smaller.

Although not shown, the wire harness 1 of the present embodiment may further include a pipe. In this case, it is preferable that the tube 3 is disposed at least within the barrel of the pipe.

The wire harness 1 of the present embodiment can be used, for example, for connecting a high-voltage battery (not shown) and an inverter (not shown) that are mounted in a vehicle such as a hybrid vehicle. Specifically, the core wire 21a of the first wire 2a disposed at one end of the wire harness 1 is connected to the high-voltage battery, and the core wire 21b of the second wire 2b disposed at the other end is connected to the inverter. The wire harness 1 of the present embodiment may be disposed underneath the floor of the vehicle.

The wire harness 1 of the present embodiment can be produced, for example, by the following method. First, a joined body in which the first wires 2a and the second wires 2b are connected in an alternating manner via the connection portions 23 is prepared. For the connection between the core wire 21a of each of the first wires 2a and the core wire 21b of each of the second wires 2b, it is possible to use a known welding method such as resistance welding and ultrasonic welding.

Next, the joined body is inserted into the tube 3 in the unshrunk state, and the tube 3 is disposed so as to cover the covering material 22a at an end portion of the first wire 2a, the connection portion 23, and the covering material 22b at an end portion of the second wire 2b. Thereafter, the tube 3 is shrunk by being heated. At this time, by application of heat and the compressive stress generated by shrinking of the tube 3, the cross-linked polyethylenes can be rendered compatible with each other at the interface between the tube 3 and each of the covering materials 22. Consequently, it is possible to directly join the tube 3 and each of the covering materials 22. As a result of the foregoing, a wire harness 1 can be obtained.

Experimental Examples

To evaluate the waterproofing performance of the wire harness 1, the following experiment was performed.

Evaluation of Sealing Performance

Two types of wires, namely, a wire A and a wire B, were prepared as the wires 2. A cross-linked polyethylene that has been cross-linked using an electron beam is contained in the covering material 22 of the wire A. The core wire of the wire A has a nominal cross-sectional area of 15 mm$^2$. The wire B has the same configuration as that of the wire A except that a cross-linked polyethylene that has been cross-linked using a silane coupling agent is contained in the covering material 22.

As the tube 3, a heat-shrinkable tube containing a cross-linked polyethylene that had been cross-linked using an electron beam was prepared.

First, a joined body was produced by joining end portions of the two wires 2. Next, the covering material 22 at the end portion of one of the wires 2, the connection portion 23, and the covering material 22 at the end portion of the other wire 2 were covered with the tube 3. Thereafter, the tube 3 was heated under the conditions (the heating temperatures and the heating times) shown in Table 1. Eleven types of specimens (hereinafter referred to as specimens T1 to T11) were thus produced.

Next, each of the specimens was sunk in a water tank, with both ends of the specimen being sealed. In this state, a compressed air of 230 kPa was supplied to the inner side of the covering material 22, and the presence or absence of leakage from between the covering material 22 and the tube 3 was checked. In the column "Initial sealing performance" in Table 1, the symbol "A" indicates the absence of leakage of the compressed air, and the symbol "B" indicates the presence of leakage.

Next, the specimens that had no leakage in the evaluation of the initial sealing performance were subjected to a thermal cycle test. Specifically, each of the specimens was subjected to 2000 repeated cycles in each of which the specimen was held at a temperature of 100° C. for 1 hour, and then held at a temperature of −40° C. for 1 hour. Using the specimens that had been subjected to the thermal cycle test, the presence or absence of leakage from between the covering material 22 and the tube 3 was checked in the same manner as in the above-described method. In the column "Sealing performance after thermal cycles" in Table 1, the symbol "A" indicates the absence of leakage of the compressed air, the symbol "B" indicates the presence of leakage, and the symbol "-" indicates that no thermal cycle test was performed.

Tensile Shear Strength

After test pieces respectively simulating the specimens had been produced, a tensile shear strength measurement was performed using each of the test pieces. Specifically, the test pieces were produced by the following method. First, a first sheet made of the same material as that of the covering material 22 used in each of the test pieces and a second sheet made of the same material as that of the tube 3 were prepared. After an end portion of the first sheet and an end portion of the second sheet had been overlapped each other, a portion where the first sheet and the second sheet was stacked was compressed at a pressure of 0.5 kPa in the stacking direction, while being heated under the conditions shown in Table 1. Test pieces were thus obtained. Note that the area of the portion where the first sheet and the second sheet were stacked was 60 mm².

Using each of the obtained test pieces, a tensile test was performed by a method prescribed in JIS K 6850:1999. Then, the breaking stress obtained by the tensile test was used as the tensile shear strength. Table 1 shows the tensile shear strengths of the test pieces respectively simulating the specimens.

TABLE 1

| Specimen symbol | Wire | Heating conditions Temperature (° C.) | Heating conditions Time (sec) | Tensile shear strength (kPa) | Initial sealing perfor- mance | Sealing perfor- mance after thermal cycles |
|---|---|---|---|---|---|---|
| T1 | Wire A | 150 | 60 | 500 | A | A |
| T2 | Wire A | 120 | 30 | 500 | A | A |
| T3 | Wire B | 150 | 60 | 450 | A | A |
| T4 | Wire B | 120 | 30 | 450 | A | A |
| T5 | Wire A | 120 | 15 | 400 | A | A |
| T6 | Wire A | 130 | 30 | 500 | A | A |
| T7 | Wire A | 190 | 180 | 500 | A | A |
| T8 | Wire A | 80 | 30 | 0 | B | — |
| T9 | Wire A | 90 | 15 | 200 | A | B |
| T10 | Wire A | 110 | 30 | 300 | A | B |
| T11 | Wire B | 110 | 30 | 250 | A | B |

As shown in Table 1, the specimens T1 to T7 having a tensile shear strength of 350 kPa or more exhibited both good initial sealing performance and good sealing performance after thermal cycles, and had no leakage of the compressed air from between the tube 3 and the covering material 22. As an example of the interface between the tube 3 and the covering material 22 in these specimens, FIG. 5 shows a TEM (i.e., transmission electron microscope) image of the interface between the tube 3 and the covering material 22 in the specimen T1.

Figure 5:
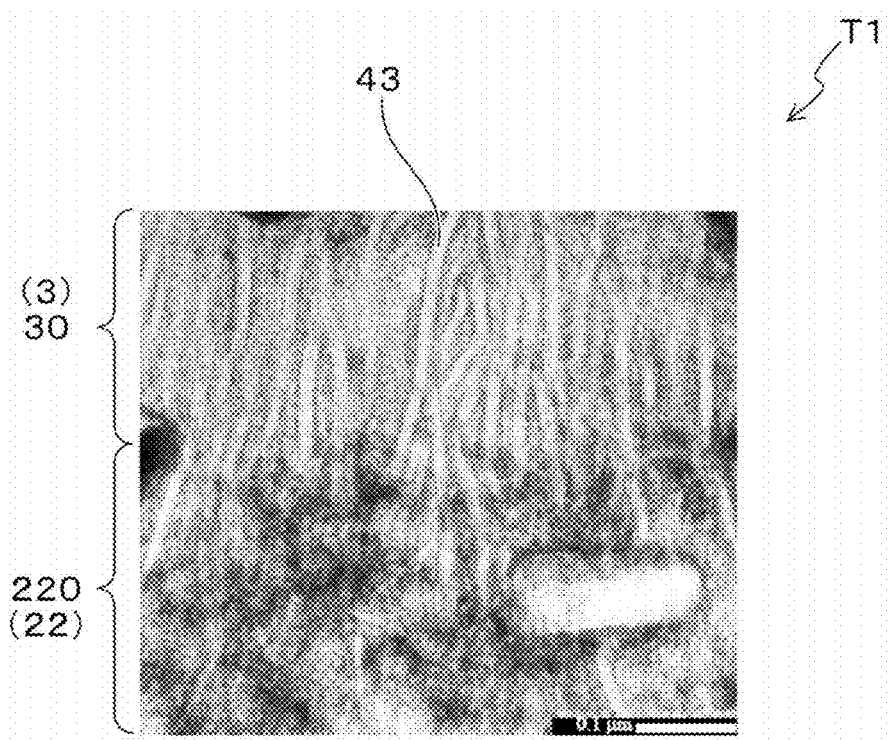
FIG. 5 is a TEM image of a specimen T1 according to an experimental example.

As shown in FIG. 5, in the TEM image of the specimen T1, the base material portion 30 of the tube 3 and the base material portion 220 of the covering material 22 were both present at the interface between the tube 3 and the covering material 22, thus making the interface therebetween unclear. In the TEM image of the specimen T1, a streaked pattern extending from the base material portion 30 of the tube 3 to the base material portion 220 of the covering material 22 beyond the interface between the tube 3 and the covering material 22 was observed. That is, the specimen T1 had the lamella phase 43 extending from the base material portion of the tube 3 to the base material portion of the covering material 22.

On the other hand, as shown in Table 1, the tube 3 and the covering material 22 were not joined in the specimen T8. This is presumably because the heating temperature was low.

The specimens T9 to T11 had a tensile shear strength of less than 350 kPa, and therefore the compressed air leaked from between the tube 3 and the covering material 22 after the thermal cycle test. As an example of the interface between the tube 3 and the covering material 22 in these specimens, FIG. 6 shows a TEM image of the interface between the tube 3 and the covering material 22 in the specimen T10.

Figure 6:
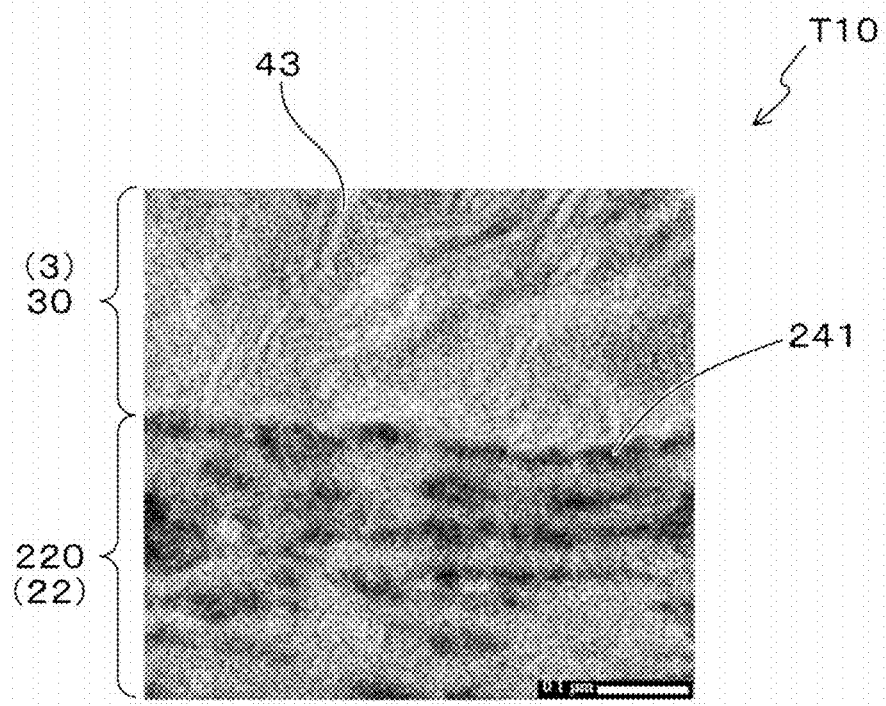
FIG. 6 is a TEM image of a specimen T10 according to an experimental example.

As shown in FIG. 6, in the TEM image of the specimen T10, the base material portion 30 of the tube 3 and the base material portion 220 of the covering material 22 were clearly separated from each other with an interface 241 between the tube 3 and the covering material 22 as a boundary. In addition, in the specimen T10, the lamella phase 43 was observed within the base material portion 30 of the tube 3. However, the lamella phase 43 of the specimen T10 remained within the base material portion 30 of the tube 3, and did not enter the base material portion 220 of the covering material 22 beyond the interface 241.

APPENDIX

According to another aspect, the wire harness of the present disclosure can also be understood as follows.
[Appendix 1] A wire harness including:
a first wire and a second wire each including a core wire and a covering material that covers the core wire; and a tube,
wherein the tube covers a connection portion between the core wire of the first wire and the core wire of the second wire,
each of the covering materials contains a cross-linked polyethylene,
the tube contains a cross-linked polyethylene,
the tube and each of the covering materials are directly joined, and
the wire harness includes a lamella phase extending from a base material portion of the tube to a base material portion of each of the covering materials.

What is claimed is:
1. A wire harness comprising:
a first wire and a second wire each including a core wire and a covering material that covers the core wire; and
a tube, wherein:
the tube covers a connection between the core wire of the first wire and the core wire of the second wire,
each of the covering materials contains a cross-linked polyethylene,
the tube contains a cross-linked polyethylene,
the tube and each of the covering materials are directly joined,
a tensile shear strength between the tube and each of the covering materials is 350 kPa or more, and
the wire harness includes a lamella phase in a cross-linked polyethylene which extends between a base material of the tube and a base material of at least one of the covering materials.
2. The wire harness according to claim 1,
wherein the wire harness includes a lamella phase respectively extending between the base material of the tube and the base material of each of the covering materials.
3. The wire harness according to claim 1,
wherein each of the core wires has a nominal cross-sectional area of 4 mm² or more.
4. The wire harness according to claim 1,
wherein the tube contains a cross-linked polyethylene that has been cross-linked using an electron beam.
5. The wire harness according to claim 1,
wherein each of the covering materials contains a cross-linked polyethylene that has been cross-linked using an electron beam, or a cross-linked polyethylene that has been cross-linked using a silane coupling agent.
6. The wire harness according to claim 1, wherein
the core wire of the first wire is a stranded wire made of copper, and the core wire of the second wire is a single-core wire or stranded wire made of aluminum.

7. The wire harness according to claim 1, wherein the wire harness includes a pipe, and the tube is disposed within a barrel of the pipe.

8. An architecture comprising:
the wire harness according to claim 6;
a high-voltage battery; and
an inverter, wherein:
   the core wire of the first wire is connected to the high-voltage battery, and
   the core wire of the second wire is connected to the inverter.

9. The architecture according to claim 8, wherein the wire harness is disposed underneath a floor of a vehicle.

* * * * *